United States Patent [19]

Kim

[11] Patent Number: 4,523,998
[45] Date of Patent: Jun. 18, 1985

[54] CONTINUOUS ION EXCHANGE PROCESS USING THERMALLY REGENERABLE LIQUID ION EXCHANGERS

[75] Inventor: Bang M. Kim, Schenectady, N.Y.

[73] Assignee: General Electric Company, Schenectady, N.Y.

[21] Appl. No.: 557,986

[22] Filed: Dec. 5, 1983

[51] Int. Cl.³ .............................................. B01D 15/04
[52] U.S. Cl. ..................................................... 210/638
[58] Field of Search ............... 210/638, 673, 675, 685, 210/686

[56] References Cited

U.S. PATENT DOCUMENTS

| | | | |
|---|---|---|---|
| 3,130,151 | 4/1964 | Levendusky | 210/675 |
| 3,425,937 | 2/1969 | Weiss et al. | 210/673 |
| 3,944,485 | 3/1976 | Rembaum et al. | 210/638 |
| 4,161,445 | 7/1979 | Coillet | 210/23 |

OTHER PUBLICATIONS

Calmon, C., *Ion Exchange for Pollution Control*, vol. II, CRC Press, 1979, pp. 161–162.
Sirotherm Desalination Ion Exchange with a Twist—Chemtech, May 1975, pp. 303–307.
Lo, T. C.; Baird, M. H. I., & Hanson, C.; "Handbook of Solvent Extraction", John Wiley & Sons, Inc. (1983), p. 631.

Primary Examiner—Ivars Cintins
Attorney, Agent, or Firm—Lawrence D. Cutter; James C. Davis; Marvin Snyder

[57] ABSTRACT

Advantage is taken of the thermal dependency of the direction of certain reactions involving liquid ion exchange materials to provide a continuous process for removal of mineral ion species from aqueous streams. The process is particularly applicable to water softening applications and also for applications involving mineral recovery. In the present invention liquid ion exchange material having mineral species attached thereto are thermally treated to redissolve these mineral species in a separate aqueous stream. The process of the present invention is operable using either direct liquid/liquid contact or with the inclusion of a membrane separating the feed solution to be treated from the liquid ion exchange material.

13 Claims, 1 Drawing Figure

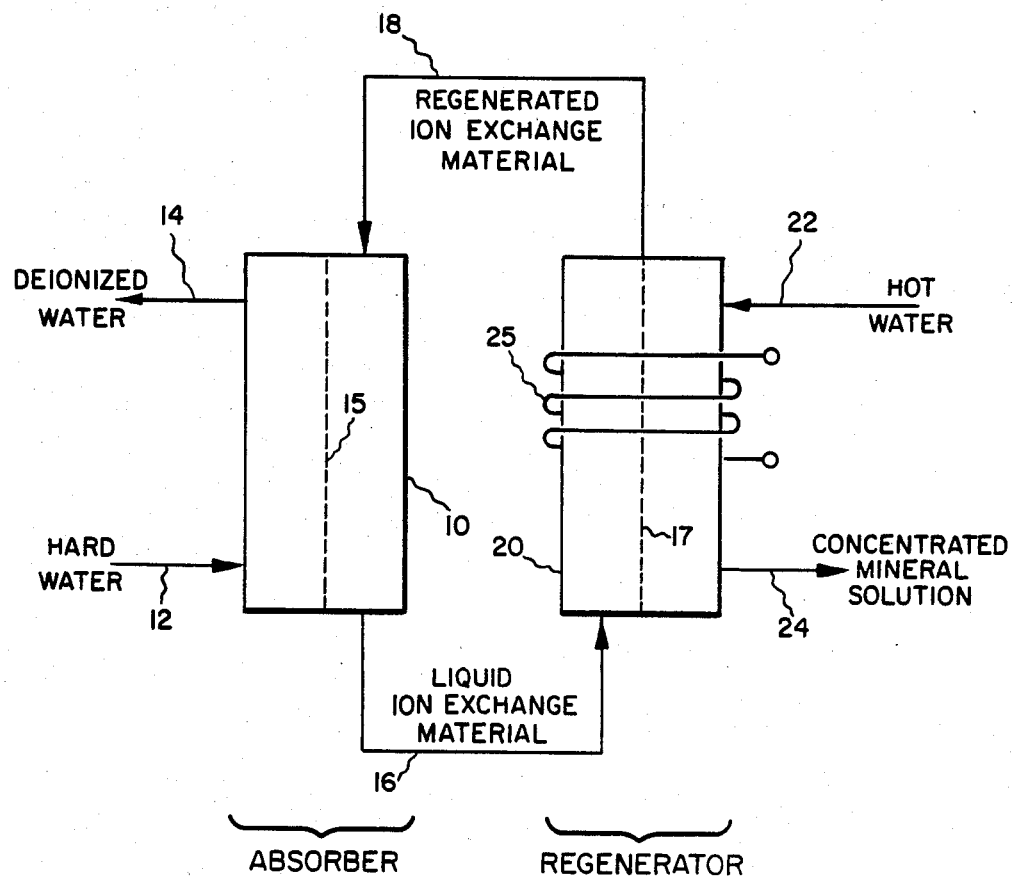

CONTINUOUS ION EXCHANGE PROCESS USING THERMALLY REGENERABLE LIQUID ION EXCHANGERS

BACKGROUND OF THE INVENTION

The present invention relates to a continuous ion exchange processes for water softening and for mineral recovery. More particularly, the present invention relates to a closed loop method employing regenerable liquid ion exchange materials for the treatment of aqueous feedwater streams containing dissolved minerals such as salts of sodium, calcium, magnesium, copper and zinc, amongst others.

It is well known that it is desirable to remove mineral species from aqueous solutions prior to certain uses. In particular, it is desirable to remove those mineral species which contribute to hard water problems in household water utilization. In particular, hard water is known to have a deleterious effect on detergents used for the washing of clothes and dishes. Moreover, hard water problems also contribute to the formation of scale in pipes and hot water heaters. It is also known that it is desirable to remove certain mineral ion species from aqueous solutions either for the purpose of recovering the mineral or for the purpose of removing an undesirable mineral containment. Accordingly, it is seen that it is desirable to remove such mineral species as sodium, calcium, magnesium, copper and zinc amongst others from aqueous solutions for one or more of the reasons stated above.

One of the methods presently employed for such mineral removal utilizes solid, thermally regenerated ion exchange resin processes which have been developed using solid resin ion exchange materials. However, processes involving such solid ion exchange materials must be operated in a batch mode and furthermore can require complex control methodologies for absorption, regeneration and rinse operations. In other, more conventional ion exchange processes, ion exchangers which are loaded with ions are regenerated by reacting with an acid, a base or a salt. This regeneration process has the disadvantage that it adds chemicals to the treated solution and therefore has a higher operating cost as a result of the consumption of chemical regenerating materials. In certain cases, the addition of chemicals to the treated water is undesirable.

Accordingly, it is seen that it would be desirable to have a continuous process for ion exchange purposes. More particularly, it would be desirable to have a process in which the ion exchange material is continuously recycled without the necessity for chemical additives to regenerate the liquid ion exchange material to an operationally desirable state.

SUMMARY OF THE INVENTION

In accordance with a preferred embodiment of the present invention a feed solution is introduced into a reaction vessel along with an insoluble liquid ion exchange material. Following contact with the aqueous solution the liquid ion exchange material is removed from the vessel and introduced into a second vessel, which for example may be flushed with hot water to change the preferred directionality of a reversible chemical process so as to dissociate the mineral species from the liquid ion exchange material and to introduce it instead into the hot aqueous stream flowing through the second reaction vessel. This is preferably carried out in a continuous process and furthermore the liquid ion exchange material from the second vessel may then be returned or recycled to the first vessel in a regenerated state to continue its function of absorbing mineral ion species from the aqueous feed solution. In an alternate embodiment of the present invention the first reaction vessel may be provided with a membrane dividing the vessel into two volumes so that the aqueous feed solution contacts one side of the membrane and the liquid ion exchange material contacts the second side of the membrane. Typically, the first reaction vessel is operated at room temperature. In yet another alternate embodiment of the present invention means for heating the contents of the second reaction vessel are provided.

Accordingly, it is an object of the present invention to provide a continuous ion exchange process for removal of mineral species from aqueous feed streams.

It is also an object of the present invention to provide a process in which liquid ion exchange materials are thermally regenerated and recycled for use in continuous processes.

It is still further object of the present invention to provide a process for the treatment of hard water.

It is yet another object of the present invention to provide a process for mineral recovery.

DESCRIPTION OF THE FIGURES

The subject matter which is regarded as the invention is particularly pointed out and distinctly claimed in the concluding portion of the specification. The invention, however, both as to organization and method of practice, together with further objects and advantages thereof may be understood by reference to the following description taken in conjunction with the accompanying drawing in which:

The FIGURE is a schematic flow diagram illustrating the process of the present invention.

DETAILED DESCRIPTION OF THE INVENTION

From the FIGURE it is appreciated that there are two principal contact reaction vessels employed in the method of the present invention. In particular, there is first reaction vessel 10 in which absorption of mineral species by a liquid ion exchange (LIX) material occurs. Additionally, there is also shown a second reaction vessel 20 in which LIX material is regenerated so that it may be recycled to vessel 10. In operation, hard water 12 or other aqueous solution containing dissolved mineral ions, is introduced into reaction vessel 10 along with LIX material 18. Preferably, LIX material is supplied at least in part from a recycling process carried out in second reaction vessel 20. Hard water 12 is contacted with LIX material 18 so that mineral ions dissolved in the hard water solution become absorbed by the LIX material. The LIX material is chosen to be substantially immiscible with aqeuous solutions. It is in this way that the mineral ion species are removed from aqueous feed stream 12. In particular, deionized water 14 may be continuously removed from reaction vessel 10. Likewise, used liquid ion exchange material 16 may also be continuously removed from vessel 10. In accordance with the present invention however, LIX material 16 is regenerated so as to return it to a substantially fully usable condition.

The regeneration of LIX material 16 occurs thermally in second reaction vessel 20. For example, hot water 22 is introduced into vessel 20 so as to thermally influence the direction of several reversible reactions (described below) occurring in vessels 10 and 20. The use of hot water 22 or optional electric heater 25 drives the equilibrium points of the reactions in a direction which favors the redissolving of the mineral ion species in the aqueous material. This thermal treatment of "used" LIX material 16 acts to restore it to a fully usable state. It is accordingly then preferably returned as regenerated LIX material 18 to first reaction vessel 10 for continued processing. The aqueous portion of the material of the liquid in vessel 20 is removed therefrom and, as a result of thermal conditions therein, contains a concentrated portion of dissolved mineral species.

The equilibrium relationships for ion exchange relationships at the different temperatures is shown a follows:

$$H^+ + OH^- \underset{\text{hot}}{\overset{\text{cold}}{\rightleftarrows}} H_2O, \tag{1}$$

$$RCOOH + Na^+ \underset{\text{hot}}{\overset{\text{cold}}{\rightleftarrows}} RCOONa + H^+, \tag{2}$$

$$R_1NR_2 + H_2O \underset{\text{hot}}{\overset{\text{cold}}{\rightleftarrows}} R_1NR_2H^+Cl^- + OH^-. \tag{3}$$

The overall reaction is:

$$RCOOH + R_1NR_2 + Na^+Cl^- \underset{\text{hot}}{\overset{\text{cold}}{\rightleftarrows}} RCOONa + R_1NR_2H^+Cl^-, \tag{4}$$

wherein R, $R_1$ and $R_2$ represent organic chemical structures.

Since the higher self-ionization of water (Equation (1)) at higher temperatures is most important in the equilibrium relationship at different temperatures, many ion exchange materials exhibit properties of thermal regeneration. The process using liquid ion exchangers, as opposed to solid ion exchange materials, can be operated continuously with conventional contactors, such as mixer-settlers, and other liquid/liquid extractors by operating the absorption and regeneration at different temperatures.

The process of the present invention can even more effectively be performed with the use of hollow fiber contactors. In this embodiment of the present invention, the liquid ion exchanger material is in contact with an aqueous solution at the interface created in the pores of a hollow fiber membrane. Accordingly, optional membrane 15 is shown in vessel 10 of the FIGURE. The LIX material picks up dissolved mineral ions in the first reaction vessel 10 (absorber). These ions are then removed from the LIX material in the second reaction vessel 20 (regenerator) by contact with hot water across optional membrane 17. The regenerated LIX material is then recycled to the first vessel. In stating that membranes 15 and 17 are optional, it is meant that, though they are preferable in the configuration shown in the FIGURE, they may be eliminated if separate direct contact devices are provided in either the absorbing section, or the regenerating section.

Examples of liquid ion exchange materials that are employable in the process of the present invention are mixtures of cation exchangers and anion exchangers. In particular, liquid cation exchange materials include carboxylic acids, alkylphosphoric acids, aryl sulfonic acids, hydroxyoximes and alkarylsulfonamides. On the other hand, primary secondary, tertiary and quaternary amines may be employed as effective liquid anion exchange materials. Additionally, these liquid ion exchange materials may be contained in diluent solutions in which the diluent is either an aromatic or aliphatic hydrocarbon.

While the four equations provided above particularly illustrate the reversibility and dependence of the reactions involved for the dissolved mineral specie of sodium, it will also be appreciated that similar equations may be written for other mineral species. Also, in general vessel 10 is typically operated at a temperature of about 20° C. (room temperature), while the contents of vessel 20 are maintained at a temperature above about 50° C. but below about 100° C. It is also noted that the LIX material may also be conveniently dissolved in solvents such as aromatic or aliphatic hydrocarbons which are substantially insoluble in water.

From the above, it should be appreciated that the process of the present invention provides an effective method for the treatment of water in at least two respects. First, it is seen that the process of the present invention provides a method for the treatment of hard water. It is also seen that the present invention provides a method for the recovery of dissolved mineral species, such as salts of cadmium, cobalt, tungsten, uranium, vanadium, copper, zinc, or salt. It is also seen that the present invention offers several significant advantages. In particular, the present invention operates on a continuous, rather than a batch basis and does not require the complicated handling associated with solid ion exchange materials. Another advantage of the present process is that a greater selectivity for the mineral species removed in output stream 24 is provided. The process also does not add any chemicals to the treated water. Furthermore, the present invention is low in cost of operation since materials employed are recycled and do not require chemical treatment additives.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A method for continuous removal of mineral ions from an aqueous feed solution, said method comprising:
   introducing said feed solution into a first reaction vessel;
   introducing a substantially aqueously insoluble mixture of liquid cation exchange material and liquid anion exchange material into said first reaction vessel with said feed solution at a first temperature, whereby said mineral ions become absorbed by said liquid ion exchange material;
   introducing said liquid ion exchange material from said first vessel into a second vessel;
   introducing an aqueous solution into said second vessel, said solution in said second vessel being controlled to be at a temperature greater than said first temperature, said second temperature being sufficient to permit the dissolving of said mineral ion species in said aqueous solution in said second vessel; and removing said aqueous solution containing said dissolved mineral species from said second vessel.

2. The method of claim 1 further including the step of returning said liquid ion exchange material from said second vessel to said first vessel.

3. The method of claim 1 in which said first vessel is divided into two volumes by a membrane, one side of which is contacted with said feed solution and the other side of which is contacted with said liquid ion exchange material.

4. The method of claim 3 in which said membrane comprises hollow fiber material.

5. The method of claim 1 in which said second vessel is divided into two volumes by a membrane, one side of which is contacted with said liquid ion exchange material and the other side of which is contacted with an aqueous solution.

6. The method of claim 5 in which said liquid ion exchange material is dissolved in a diluent selected from the group consisting of aromatic and aliphatic hydrocarbons.

7. The method of claim 1 in which said liquid cation exchange material is selected from the group consisting of carboxylic acids, alkylphosphoric acids, arylsulfonic acids, hydroxyoximes and alkarylsulfonamides.

8. The method of claim 1 in which said liquid anion exchange material is selected from the group consisting of primary, secondary, tertiary and quaternary amines.

9. The method of claim 1 in which said first temperature is room temperature.

10. The method of claim 1 in which said second temperature is above about 50° C. and below about 100° C.

11. The method of claim 1 in which said mineral ions are selected from the group consisting of sodium, calcium, copper, cadmium, cobalt, magnesium, zinc, tungsten, uranium and vanadium.

12. The method of claim 1 further including heating the liquid in said second reaction vessel.

13. The method of claim 1 in which said aqueous solution introduced into said second vessel is heated prior to introduction into said second vessel.

* * * * *